United States Patent [19]
Miller

[11] 3,926,648
[45] Dec. 16, 1975

[54] SINTERED CORDIERITE GLASS-CERAMIC BODIES

[75] Inventor: David M. Miller, Elmira, N.Y.

[73] Assignee: Corning Glass Works, Corning, N.Y.

[22] Filed: June 7, 1974

[21] Appl. No.: 477,197

[52] U.S. Cl.................................. 106/39.6; 106/52
[51] Int. Cl.² ........................................... C03C 3/22
[58] Field of Search........................... 106/39.6, 52

[56] References Cited
UNITED STATES PATENTS

| | | | |
|---|---|---|---|
| 2,920,971 | 1/1960 | Stookey | 106/39.6 |
| 3,268,315 | 8/1966 | Stookey | 106/52 X |
| 3,282,711 | 11/1966 | Lin | 106/39.6 |
| 3,365,314 | 1/1968 | Sack | 106/52 X |
| 3,450,546 | 6/1969 | Stong | 106/52 X |
| 3,480,452 | 11/1969 | Fleischner | 106/52 X |
| 3,490,888 | 1/1970 | Strong | 106/52 X |

*Primary Examiner*—Winston A. Douglas
*Assistant Examiner*—John F. Niebling
*Attorney, Agent, or Firm*—Clinton S. Janes, Jr.; Clarence R. Patty, Jr.

[57] ABSTRACT

The present invention relates to means for sintering powdered glasses having compositions approximating the stoichiometry of cordierite ($2MgO.2Al_2O_3.5SiO_2$) into strong bodies exhibiting low coefficients of thermal expansion and containing hexagonal cordierite as the crystal phase. Additions of minor amounts of $K_2O$ and/or $Cs_2O$ to the glass compositions are unique in imparting excellent sinterability at temperatures of 1050°C. and below, and yielding a body which retains a low coefficient of thermal expansion even after repeated thermal cycling to 1000°C.

2 Claims, 1 Drawing Figure

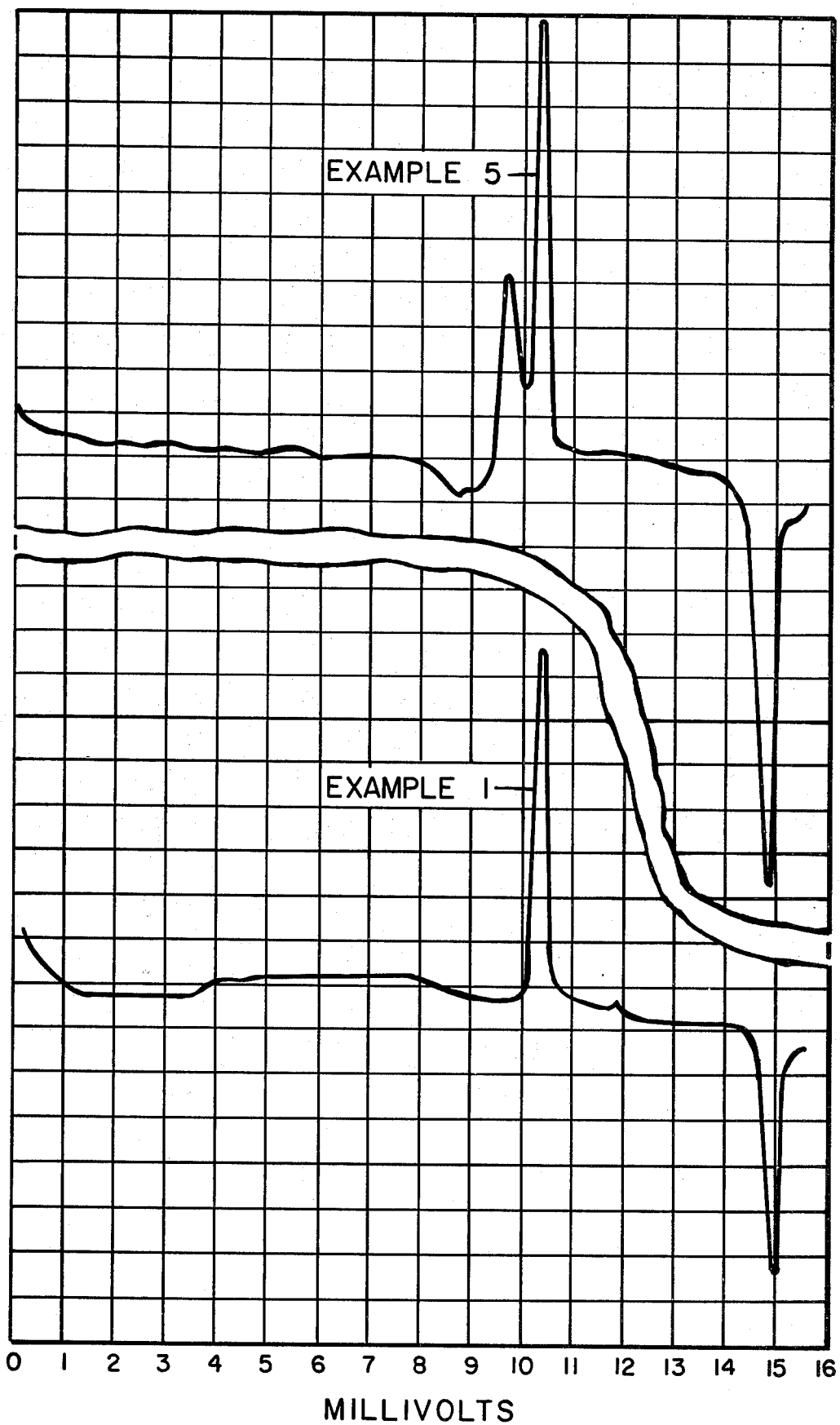

SINTERED CORDIERITE GLASS-CERAMIC BODIES

Cordierite is a crystalline material demonstrating relatively high refractoriness, having a melting point of about 1460°C., and, in a pure form, exhibits excellent electrical insulating properties and a relatively low coefficient of thermal expansion over the range up to 1000°C., viz., about $16 \times 10^{-7}/°C$. However, the sinterability of glass powders having the stoichiometry of pure cordierite is very poor. As illustrative of this fact, the forming of powdered glasses of the cordierite composition into bars, which are then fired to temperatures up to 1200°C., results in porous, granular, mechanically-weak ceramic bodies.

Therefore, the principal objective of the instant invention is to provide means for sintering glass powders having compositions approximating the stoichiometry of cordierite at relatively low temperatures to yield bodies containing hexagonal cordierite as the crystal phase, while maintaining the inherent high refractoriness of and low coefficient of thermal expansion of pure cordierite.

That objective can be achieved utilizing base glasses approximating the stoichiometry of cordierite ($2MgO \cdot 2Al_2O_3 \cdot 5SiO_2$ is equivalent, in weight percent, to about 13.6% MgO, 34.9% $Al_2O_3$, and 51.4% $SiO_2$) and adding about 0.5–2.5% $K_2O$ and/or $Cs_2O$ thereto. Articles formed by the sintering of such glasses at temperatures below about 1050°C., generally about 825°–1050°C., demonstrate coefficients of thermal expansion over the range of 25°–1000°C. of between about $13-18 \times 10^{-7}/°C.$, a use temperature of about 1300°C., and exhibit good thermal stability when repeatedly cycled between room temperature and 1000°C.

Table I reports a group of glasses having compositions recorded in parts by weight as expressed on the oxide basis. However, inasmuch as the total of the recited components approximates 100, the individual amounts can be deemed to essentially reflect percentages. The actual batch ingredients may be any materials, either the oxides or other compounds, which, when melted together, will be converted into the desired oxide in the proper proportion.

The batch ingredients were blended together in a ball mill to aid in securing a homogeneous melt and then run into platinum crucibles. The crucibles were placed in an electrically-fired furnace and the batches melted for about 16 hours at 1600°C. with stirring. Each melt was thereafter poured as a fine stream into a container of water. The glass granules resulting therefrom were dried and then crushed to pass a No. 400 U.S. Standard Sieve (37 microns). Ball milling and fluid energy milling were two techniques utilized in subdividing the granules to a fine powder averaging about 10–15 microns in diameter.

The glass powders were subsequently pressed into rectangular bars about $3 \times \frac{1}{2} \times \frac{1}{4}$ inch employing water or a volatile organic liquid as a vehicle and fired to a particular sintering temperature. Since the dimensions of the bars were relatively small and the configuration thereof uncomplicated, no special firing technique was required in the sintering step. Simply heating the bars at furnace rate from room temperature or plunging them into a furnace operating at a particular temperature permitted volatilization of the vehicle at a sufficient rate such that cracking was not observed.

TABLE I

|  | 1 | 2 | 3 | 4 | 5 |
|---|---|---|---|---|---|
| $SiO_2$ | 50.03% | 50.93% | 50.9% | 51.01% | 51.36% |
| $Al_2O_3$ | 34.08 | 34.48 | 34.6 | 34.6 | 34.86 |
| MgO | 13.43 | 13.41 | 13.7 | 13.7 | 13.6 |
| $Cs_2O$ | 2.29 | 0.93 | — | — | — |
| $K_2O$ | — | — | 0.9 | 0.79 | — |
| CaO | 0.1 | 0.1 | 0.1 | 0.1 | 0.1 |

Table II records the sintering procedure applied to the examples of Table I along with a visual description of the fired bars, a characterization of the sintering behavior exemplified based upon the linear shrinkage observed, and a measurement of the thermal expansion coefficient over the range 25°–900°C. ($\times 10^{-7}/°C.$) exhibited by the bars as determined by techniques conventional for such measurements. X-ray diffraction analysis of the final product indicated the presence of hexagonal cordierite as the sole crystal phase. A shrinkage of at least about 10% during the firing step was adjudged indicative of good sintering behavior. An electrically-fired furnace was utilized. Upon completion of the sintering, the electric current to the furnace was cut off and the furnace allowed to cool to room temperature with the bars retained therein.

TABLE II

| Example No. | Sintering Treatment | Visual Description | Sintering Shrinkage | Expansion Coefficient |
|---|---|---|---|---|
| 1 | Heat at 5°C./min. to 980°C. Hold for 1 hour | White, strong | 18% | 17 |
| 2 | Plunge into furnace at 750°C. Hold for 1 hour Heat at 5°C./min. to 1050°C. Hold for 2 hours | White, strong | 20% | 13.3 |
| 3 | Plunge into furnace at 750°C. Hold for 1 hour Heat at 5°C./min. to 1050°C. Hold for 2 hours | White, strong | 13% | 14.2 |
| 4 | Plunge into furnace at 750°C. Hold for 1 hour Heat at 5°C./min. to 1050°C. Hold for 2 hours | White, strong | 18% | 14.5 |
| 5 | Plunge into furnace at 850°C. Hold for 1 hour Heat at 5°C./min. to 1050°C. Hold for 2 hours | White, weak | 2% | 11.3 |

Initial sintering of the $K_2O$ and/or $Cs_2O$-containing glasses can be observed at about 825°C. However, long dwell times, e.g., up to 12 hours, may be demanded for substantial sintering to take place. Therefore, temperatures in excess of 900°C. are preferred.

The effect of $K_2O$ and $Cs_2O$ additions on the sinterability of cordierite glasses is readily apparent through a comparison of Examples 1–4 with Example 5, a glass consisting essentially of the cordierite stoichiometry. Hence, Examples 1–4 can be sintered to solid, strong bodies at temperatures of 1050°C. and below whereas Example 5 is very poorly sintered when fired at 1050°C. And, as has been observed above, a glass having the composition of Example 5 will be poorly sintered even after firing at a temperature of 1200°C.

A comparison of the coefficient of thermal expansion exhibited in Examples 1–4 with that displayed by Example 5 is also of great interest in that the differences therebetween are relatively slight. This factor is of particular significance since the addition of $K_2O$ and/or $Cs_2O$ enables the low temperature sintering of a glass having approximately the cordierite stoichiometry, while retaining the essential physical properties of cordierite.

Table III reports a group of glass compositions based upon the cordierite stoichiometry to which were added small amounts of various oxides to determine the effect thereof upon sinterability and, concomitantly, to learn what effect each addition would have upon the coefficient of thermal expansion. In each instance, the base glass was Example 5 and the examples recorded reflect weight percent additions to that base glass. The batching, melting, and forming parameters employed in producing rectangular glass bars about 3 × ½ × ¼ inch were similar to those utilized with Examples 1–5 of Table I. In like manner to Table II, a linear shrinkage of at least 10% during the sintering process was deemed desirable to yield a strong body.

also deleteriously affects the electrical properties thereof.

The most optimum properties are secured where the MgO, $Al_2O_3$, and $SiO_2$ contents of the glass closely approximate the stoichiometry of cordierite. Nevertheless, as Tables I and II readily demonstrate, small variations therefrom can be tolerated and very satisfactory properties will be exhibited by the resulting bodies. However, such variations will be maintained within the ranges of about 11–16.5% MgO, 31–41% $Al_2O_3$, and 47–55% $SiO_2$ with the preferred compositions for refractoriness and low expansion ranging about 12.5–14.5% MgO, 34–36% $Al_2O_3$, and 49–52% $SiO_2$.

Likewise, whereas minor additions of extraneous components can be tolerated, the most desirable products will be composed essentially entirely of MgO, $Al_2O_3$, $SiO_2$, $K_2O$, and/or $Cs_2O$. And, as has been noted above, the inclusion of $Li_2O$ and/or $Na_2O$ is particularly discouraged. In sum, the total of all non-essential additions ought not to exceed about 3% by weight.

The mechanism through which $K_2O$ and $Cs_2O$ influence the sintering character of the cordierite-stoichiometry glass is not fully understood, but differential thermal analyses (DTA), coupled with X-ray diffraction analyses, of the bodies are believed to provide an explanation. In the appended drawing, the top curve is a DTA of the pure cordierite glass (Example 5) and the bottom curve is a DTA of the $Cs_2O$-containing glass, Example 1.

The two exothermic peaks associated with Example 5 are characteristic for most cordierite ceramics produced from glass. The first peak is the result of the formation of the metastable betaquartz solid solution phase (also termed $\mu$-cordierite) and the second peak is due to the development of the hexagonal form of

TABLE III

| Example No. | Composition | Sintering Treatment | Sintering Shrinkage | Strength |
|---|---|---|---|---|
| 6 | +0.43% BeO | Heat at 5°C./minute to 980°C. | 1–3% | poor |
| 7 | +1.2 % MnO | Heat at 5°C./minute to 980°C. | 1–3% | poor |
| 8 | +1.2 % FeO | Heat at 5°C./minute to 980°C. | 1–3% | poor |
| 9 | +1.26% CoO | Heat at 5°C./minute to 980°C. | 1–3% | poor |
| 10 | +1.26% NiO | Heat at 5°C./minute to 980°C. | 1–3% | poor |
| 11 | +1.34% CuO | Heat at 5°C./minute to 980°C. | 1–3% | poor |
| 12 | +1.37% ZnO | Heat at 5°C./minute to 980°C. | 1–3% | poor |
| 13 | +0.95% CaO | Heat at 5°C./minute to 980°C. | 1–3% | poor |
| 14 | +1.74% SrO | Heat at 5°C./minute to 980°C. | 1–3% | poor |
| 15 | +0.59% $B_2O_3$ | Heat at 5°C./minute to 980°C. | 8% | fair |
| 16 | +1.53% $V_2O_5$ | Heat at 5°C./minute to 980°C. | 4% | poor |
| 17 | +1.28% $Cr_2O_3$ | Heat at 5°C./minute to 980°C. | 8% | fair |
| 18 | +1.35% $TiO_2$ | Heat at 5°C./minute to 980°C. | 1–2% | poor |
| 19 | +1.76% $GeO_2$ | Heat at 5°C./minute to 980°C. | 8% | fair |
| 20 | +2.06% $ZrO_2$ | Heat at 5°C./minute to 980°C. | 8% | fair |
| 21 | +0.37% $Na_2O$ | Heat at 5°C./minute to 980°C. | 8% | fair |
| 22 | +0.25% $Li_2O$ | Heat at 5°C./minute to 980°C. | 8% | fair |

With the exception of Example 17, the coefficient of thermal expansion over the range of 25°–1000°C. varied between about 12–20 × $10^{-7}$/°C. The addition of even very small amounts of $Cr_2O_3$ appears to cause the expansion to rise over 20 × $10^{-7}$/°C. Unfortunately, the additions giving rise to bodies exhibiting fair strengths, and, hence, fair sinterability, also adversely affected the refractoriness of the final product. And, where even larger additions thereof were made in an attempt to achieve good sinterability, the resulting bodies demonstrated use temperatures below 1150°C. and/or coefficients of thermal expansion far in excess of 20 × $10^{-7}$/°C. Finally, the inclusion of $Li_2O$ and/or $Na_2O$ not only reduces the refractoriness of the final product but cordierite. From the bottom curve, it appears that the addition of $Cs_2O$ suppresses the formation of the betaquartz solid solution phase and crystallization occurs only at the higher temperatures. Hence, it is believed that the developments of beta-quartz solid solution and hexagonal cordierite are superimposed at the higher temperature exotherm. This phenomenon has the further effect of stabilizing the glass against crystallization in the temperature range where glass sintering is initiated. Hence, sintering in Example 1 has been demonstrated to commence at about 830°C. When held at that temperature, the glass will sinter for about 9–13 hours before substantial devitrification and stiffening of the body will occur.

I claim:

1. A sintered glass-ceramic body containing hexagonal cordierite as the crystalline phase, exhibiting a coefficient of thermal expansion (25°–1000°C.) between about $13-18 \times 10^{-7}$/°C., and demonstrating a use temperature up to 1300°C. consisting essentially, by weight on the oxide basis, of about 11–16.5% MgO, 31–41% $Al_2O_3$, 47–55% $SiO_2$, and 0.5–2.5% $K_2O$ and/or $Cs_2O$.

2. A sintered glass-ceramic body according to claim 1 consisting essentially, by weight on the oxide basis, of about 12.5–14.5% MgO, 34–36% $Al_2O_3$, 49–52% $SiO_2$, and 0.5–2.5% $K_2O$ and/or $Cs_2O$.

* * * * *